United States Patent [19]

Kondo et al.

[11] Patent Number: 5,038,205
[45] Date of Patent: Aug. 6, 1991

[54] AUTOMATIC WHITE BALANCE CONTROL CIRCUIT WHICH OPERATES ON SUCCESSIVE FIELDS OF VIDEO DATA

[75] Inventors: Toshiharu Kondo, Kanagawa; Takashi Kohashi, Chiba, both of Japan

[73] Assignee: Sony Corporation, Tokyo, Japan

[21] Appl. No.: 525,992

[22] Filed: May 21, 1990

[30] Foreign Application Priority Data

May 30, 1989 [JP] Japan .................... 1-137240

[51] Int. Cl.⁵ .................................. H04N 9/64
[52] U.S. Cl. ....................................... 358/29
[58] Field of Search .................. 358/29, 35, 29 C

[56] References Cited

U.S. PATENT DOCUMENTS 4,843,456  6/1989  Iida et al. ............... 358/29 C
4,992,855  2/1981  Takai ....................... 358/29

FOREIGN PATENT DOCUMENTS 2159592  7/1987  Japan .
2178091  8/1987  Japan .
2178093  8/1987  Japan .

Primary Examiner—Howard W. Britton
Assistant Examiner—Wendy R. Greening
Attorney, Agent, or Firm—Alvin Sinderbrand; William S. Frommer

[57] ABSTRACT

In an automatic white balance control circuit for adjusting gain levels of a plurality of color signals included in a video signal composed of successive fields and received from a video camera while a light source provides illumination for the scene in the field of view of the camera; first, second and third integrators generate integration signals for each of the received color signals in each of first, second and third fields, respectively, a control signal for each of the fields is generated on the basis of the respective integration signals, and gain levels of at least two of the color signals are adjusted in response to the control signal so as to perform white balancing for preventing variation in video signal brightness or flicker, such as is caused by a difference between the video camera exposure frequency and the light source power supply frequency.

16 Claims, 5 Drawing Sheets

AUTOMATIC WHITE BALANCE CONTROL CIRCUIT WHICH OPERATES ON SUCCESSIVE FIELDS OF VIDEO DATA

BACKGROUND OF THE INVENTION

1. The present invention relates to an automatic white balance control circuit and, more particularly, to a picture integration type automatic white balance control circuit.

2. Description of the Prior Art

As shown in FIG. 1, in a conventional automatic white balance control circuit, an optical image is projected by a lens system 51 onto a charge-coupled device (CCD) 52, having complementary color filters, and wherein the image is converted into an electric signal which is supplied to a sample/hold, color separation and automatic gain control (AGC) circuit 53. Color-sequential signals S3, comprising yellow (Ye), green (G) and cyan (Cy) signals, are separated at the sample/hold and color separation portion of circuit 53 by color separation pulses having respective color phases. The separated signals S3(4e), S3(G) and S3(Cy) are supplied through the AGC portion of circuit 53 to an arithmetic circuit 54, in which such signals are converted into three primary color signals, that is, red, green and blue (R,G,B). The color signals R, G and B are supplied to an automatic white balance control circuit which generally comprises variable gain amplifiers 55, 56 and 57, integration circuits 58, 59 and 60, analog-to-digital converters 61, 62 and 63, a controller 68 and digital-to-analog converters 69 and 70. More specifically, the color signals R, G and B are supplied to the variable gain amplifiers 55, 56 and 57, respectively, and the variable gain amplifier 56 has a constant gain level of 1. The color signals R, G and B are also supplied to the integration circuits 58, 59 and 60, respectively, which are adapted to integrate the received color signals and provide respective integrated value signals therefrom. Thus, the output level of the color signal R is integrated at integration circuit 58 and an integrated value signal IR, representing an average level of the color signal R, is supplied to the analog-to-digital converter 61. Integrated value signals IG and IB are similarly obtained from integration circuits 59 and 60, respectively, and are supplied to analog-to-digital converters 62 and 63, respectively. The digitized integrated value signals are supplied to controller 68 which is adapted to calculate the ratio of the integrated value signal IR to the integrated value signal IG and the ratio of the integrated value signal IB to the integrated value IG, that is, the ratios IR/IG and IB/IG, respectively. Reference ratios IRO/IGO and IBO/IGO, obtained while viewing a "white" camera subject under a light source with various color temperatures, are previously calculated and retained by controller 68, and are utilized in generating a blackbody radiation curve CBL, such as is shown in FIG. 2. A tracking range A1 is provided on each side of the blackbody radiation curve CBL.

As illustrated in FIG. 2, the ratios IR0/IG0 and IB0/IB0 are inversely proportional to each other, that is, as one of the ratios IR0/IG0 and IB0/IGO increases, the other decreases. Further, as the color temperature increases so does the ratio IB0/IG0. On the other hand, as the color temperature decreases the ratio IR0/IG0 increases.

White balancing is only performed when the ratios IR/IG and IB/IG fall within the tracking ranges A1. More specifically, a determination is made, at controller 68, whether the ratios IR/IG and IB/IG obtained from actual picture data are within the tracking ranges A1. If the ratios lie within the tracking range A1, white balancing is effected with the gain levels of the color signals R and B being calculated on the basis of the ratios IR/IG and IB/IG. In other words, digital gain control signals are produced in controller 68 and are supplied as analog control signals DGR and DGB to variable gain amplifiers 55 and 57 through D/A converters 69 and 70, respectively. The gain levels of the amplifiers 55 and 57, which are proportionally controlled by gain control signals DGR and DGB, respectively, can be expressed as follows:

gain of the amplifier 55 (Rg)=1/ (IR/IG)

gain of the amplifier 57 (Bg)=1/ (IB/IG)

As a result, the output signal levels of the three primary color signals R, G and B from the respective amplifiers 55, 56 and 57 are set equal to each other, that is, (R:G:B= 1:1:1) when the camera is focused on a "white" subject. Further, when the ratios IR/IG and IB/IG lie within the tracking ranges A1, white balancing is performed. On the other hand, when the ratios IR/IG and IB/IG fall outside the tracking ranges A1, white balancing is difficult to achieve, and, in this situation, white balancing is not performed and the gain levels of amplifiers 55 and 57 are maintained at their previous levels.

The three primary color signals R, G and B from variable gain amplifiers 55, 56 and 57 are supplied to a matrix circuit 64 in which, the color signals are converted into color difference signals R-Y and B-Y. The color difference signals R-Y and B-Y and a luminance signal Y suitably applied to a terminal 65 are supplied to an encoder 66 which is adapted to convert the received signals into a color video signal SVD in the NTSC format supplied to an output terminal 67.

When a conventional video camera equipped with the described automatic white balance control circuit is operated with the scene in the field of view illuminated by a light source of varying intensities and color temperatures, such as, a fluorescent lamp, the conventional automatic white balance control circuit may not operate properly. More specifically, the intensity and color temperature of a fluorescent lamp energized from an AC power supply source vary depending upon the instantaneous voltage of such power supply source. The resulting variation in the intensity and color temperature frequently causes the ratios IR/IG and IB/IG to fall outside the tracking ranges A1. As previously mentioned, adjustment of the primary color gain levels by the known automatic white balance circuit is normally effected only when the ratios IR/IG and IB/IG fall within the tracking ranges A1.

Further, when the camera exposure or field frequency and the light source power supply frequency differ, flicker may result, that is, there may be a variation in the brightness of the color image signal from one field to the next. For example, in Japan, if the exposure period of an imager, such as the CCD 52, corresponds to 60 Hz while the standard power supply source frequency is 50 Hz, the amount of light to which the imager is exposed varies between fields as shown in FIG. 3, in which a full wave rectified 50 Hz power supply signal is shown in relation to successive field periods F1, F2, F3 . . . etc. Thus, the produced image signal contains a variation in brightness, or flicker. It is to be appreciated from FIG. 3 that the amount of light to which a scene is exposed in the field F4 is the same as that for the field F1. In other words, the exposure of a field $F_n$ is equal to that of a field $F_{n+3}$ which is positioned three fields later so that the flicker has a frequency of 20 Hz.

Since the integration output signals from integration circuits 58, 59 and 60 include the flicker component, the conventional automatic white balance control circuit cannot remove flicker during the balancing operation.

OBJECTS AND SUMMARY OF THE INVENTION

Accordingly, it is an object of this invention to provide an automatic white balance control circuit which avoids the above-mentioned disadvantages of the prior art.

More specifically, it is an object of the present invention to provide an improved automatic white balance control circuit capable of removing flicker components.

It is another object of the present invention to provide an improved automatic white balance control circuit, as aforesaid, which is capable of detecting a three-phase change in the color temperature of the light source and acting in response thereto to switch tracking ranges so as to allow white balancing to be performed even when the light source has a relatively wide variation in color temperatures.

According to an aspect of the present invention, an automatic white balance control circuit for adjusting gain levels of a plurality of color signals included in a video signal composed of successive fields and received from a video camera while a light source provides illumination of the scene in the field of view of the camera, comprises: first integrating means generate a first integration output signal for each of the color signals in a first field, second integrating means generate a second integration output signal for each of the color signals in a second field occurring after the first field and third integrating means generate a third integration output signal for each of the color signals in a third field occurring after the second field; generating means for generating a control signal for each of the fields on the basis of the first, second and third integration output signals for the respective fields; and gain control means for adjusting gain levels of at least two of the color signals in response to the control signal so as to perform white balancing.

The above, and other objects, features and advantages of the present invention, will be apparent in the following detailed description of a preferred embodiment of the invention when read in conjunction with the accompanying drawings in which corresponding parts are identified by the same reference numerals in the several views.

DETAILED DESCRIPTION OF THE PREFERRED EMBODIMENTS

An improved picture integration-type automatic white balance control circuit of the feedforward type according to an embodiment of the present invention will now be described in detail with reference to FIGS. 4-7.

Figure 1:
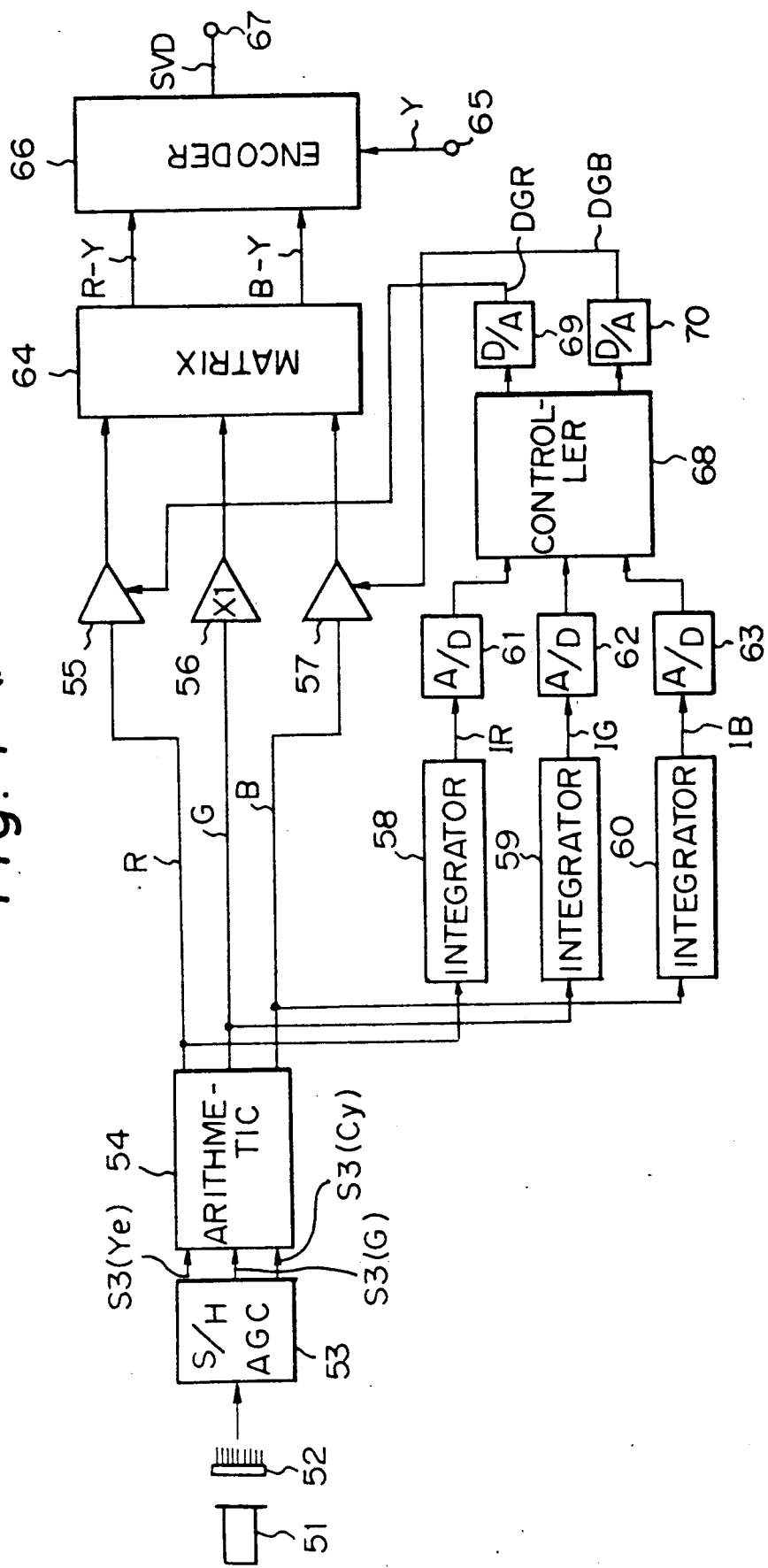
FIG. 1 is a block diagram illustrating an automatic white balance control circuit according to the prior art.
Figure 4:
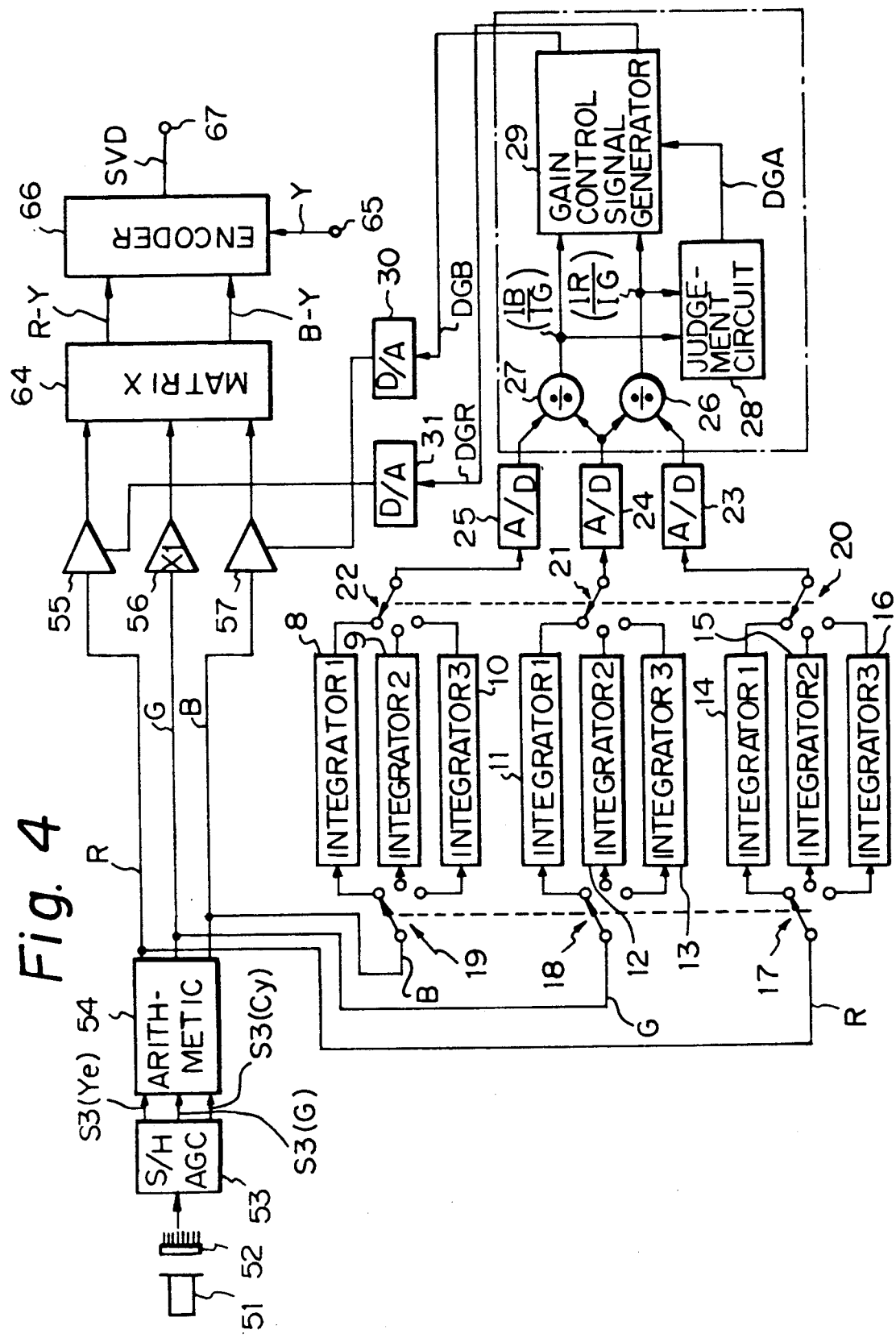
FIG. 4 is a block diagram showing an automatic white balance control circuit according to an embodiment of this invention.

As shown in FIG. 4, an optical image from a lens system 51 is converted into an electric signal by a CCD 52 and outputted through a sample/hold, color separation and an AGC circuit 53 to an arithmetic circuit 54 in a manner similar to that previously described with reference to FIG. 1 so that such description will not be here repeated. As before, the three primary color signals R,G and B from arithmetic circuit 54 are supplied to variable gain amplifiers 55, 56 and 57, respectively, with the variable gain amplifier 56 having a constant gain level of 1. The R, G and B color signals from arithmetic circuit 54 are further supplied to switching circuits 17, 18 and 19, respectively, which are ganged so as to simultaneously supply the respective color signals for successive fields to the respective integration circuits 8-16. More specifically, the color signal R is switched between successive fields by switching circuit 17 so as to be supplied to integration circuits 14, 15 and 16 during first, second and third fields, respectively. Likewise, the color signal G is switched between the successive fields by switching circuit 18 and supplied to integration circuits 11, 12 and 13, respectively, during the first, second and third fields, respectively, and the color signal B is switched between successive fields by switching circuit 19 and supplied during the first, second and third fields to integration circuits 8, 9 and 10, respectively. Each of the integration circuits 8-16 operates in a manner similar to the integration circuits 58-60 previously described with reference to FIG. 1, that is, to integrate the respective received color signals and provide respective integrated value signals therefrom. The integrated value signals from integration circuits 14-16, 11-13 and 8-10 are supplied to switching circuits 20, 21 and 22, respectively, which are also ganged to operate simultaneously with the switching circuits 17, 18 and 19, respectively.

Figure 7:
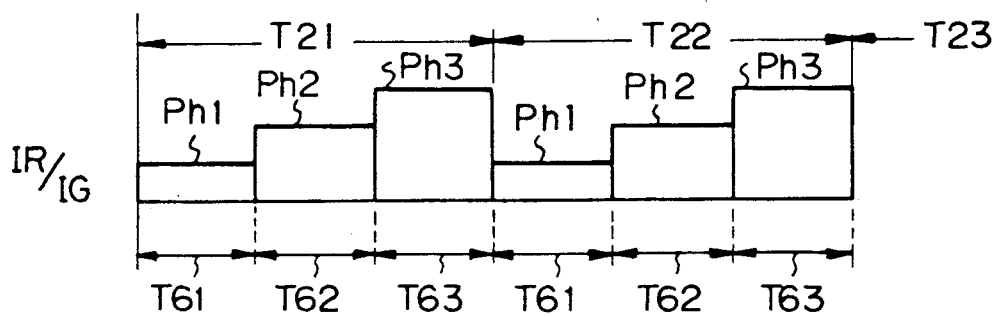
FIG. 7 is a diagram to which reference will be made in explaining three phases of the video signal.

The overall operation of integration circuits 8-16 will now be described with reference to FIGS. 4 and 7.

When a video camera is operated with the scene in its field of view illuminated by a light source, such as, a fluorescent lamp, energized from a power supply having a frequency of 50 Hz while the camera has an exposure or field frequency of 60 Hz, the video camera output signal undergoes a three-phase change, as previously described. To accommodate the three phases, three sets of integration circuits are utilized, with each set generating successive integration value signals for the respective phases. More specifically, and by way of example, the three integration circuits 8, 9 and 10 generate integrated value signals for respective phases of the color signal B. The color signal B contained in a first phase Phl, is integrated during an interval T61 by integration circuit 8. The color signals B contained in the second phase Ph2 and the third phase Ph3 are integrated by integration circuits 9 and 10 during intervals T62 and T63, respectively. Thus, an integration output signal IB is obtained for each phase. Likewise, the integration circuits 11, 12 and 13 and the integration circuits 14, 15 and 16 generate integrated value signals IG and IR for respective phases of color signals G and R, respectively. More specifically, integration circuits 11 and 14 provide integrated value signals IG, IR for the first phase Phl in the interval T61, integration circuits 12 and 15 provide integrated value signals IG, IR for the second phase Ph2 in the interval T62 and integration circuits 13, 16 provide integrated value signals IG, IR for the third phase Ph3 in the interval T63. Therefore, the integration circuits 8, 11, 14 provide integration output signals IB, IG, IR corresponding to a first phase Ph1 in each of successive intervals T21, T22, T23 . . . etc. shown on FIG. 7. In a similar manner, integration circuits 9, 12, 15 and integration circuits 10, 13, 16 provide integrated output signals IB, IG, IR for a second phase Ph2 and a third phase Ph3, respectively. It is to be appreciated that, for the described example, the intervals T21, T22, T23 . . . etc. have periods corresponding to a frequency of 20 Hz, whereas the periods of the phases Phl, Ph2 and Ph3, that is, T61, T62 and T63, correspond to that of a field, that is, to a frequency of 60 Hz.

The integrated value signals IR for phases Phl, Ph2 and Ph3 are supplied from integration circuits 14, 15 and 16, respectively, through the switching circuit 20, to an A/D converter 23 in which the IR signals are digitized. The digitized IR signals are supplied to one input of a dividing circuit 26. The integrated value signals IG for phases Ph1-Ph3 are supplied through the switching circuit 21 and an A/D converter 24 to another input of the dividing circuit 26 and to one input of a dividing circuit 27, and the integrated value signals IB for phases Ph1-Ph3 are supplied through the switching circuit 22 and an A/D converter 25 to another input of dividing circuit 27. Dividing circuit 26 is adapted to calculate the ratio IR/IG for every phase. Similarly, dividing circuit 27 calculates the ratio IB/IG for every phase. The calculated ratios IR/IG and IB/IG are supplied to a judgement circuit 28 and to a gain control signal generator 29.

It is to be appreciated that dividing circuits 26 and 27, judgement circuit 28, and gain control signal generator 29 may be constituted by a microprocessor as represented by the one-dot and dash lines enclosing such components in FIG. 4.

Figure 2:
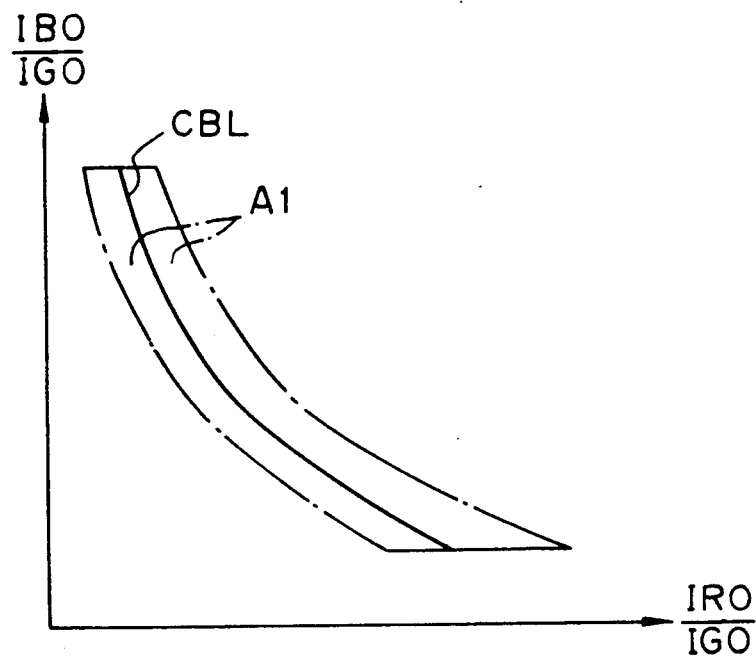
FIG. 2 is a diagram illustrating a blackbody radiation curve and the tracking ranges therefor used in the white balance control circuit of FIG. 1.
Figure 3:
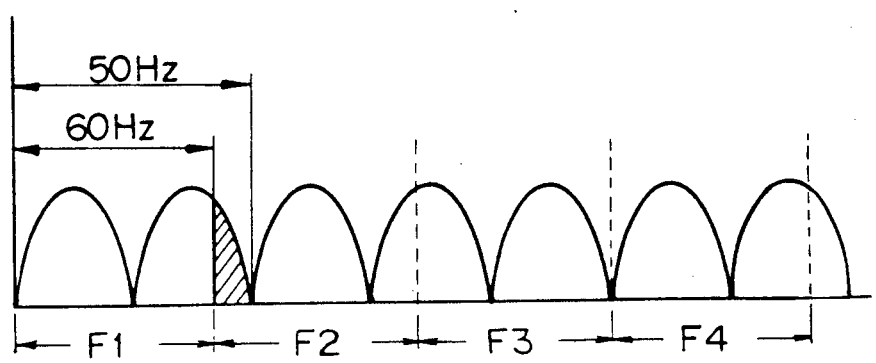
FIG. 3 is a waveform diagram showing a relationship between a power supply source frequency and a field frequency.
Figure 5:
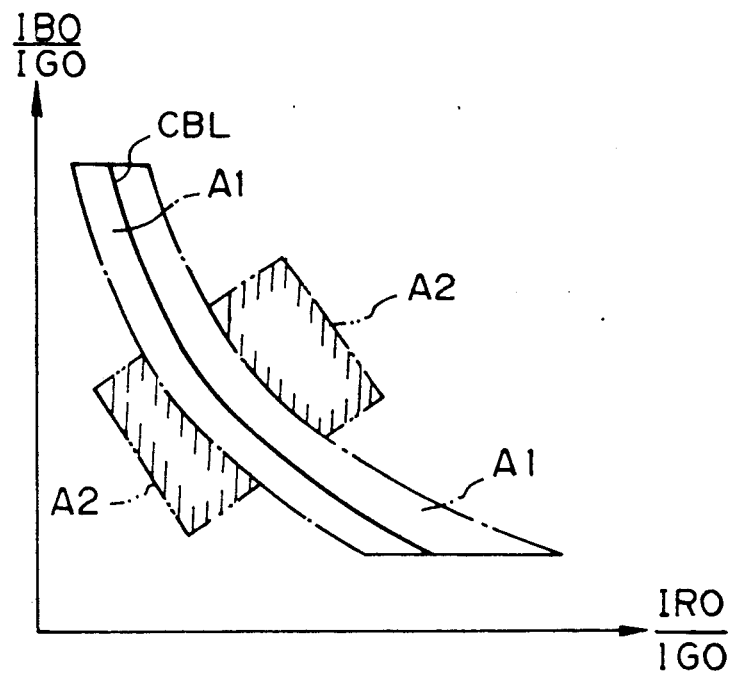
FIG. 5 is a diagram illustrating a blackbody radiation curve and the tracking ranges therefor employed in the white balance control circuit of FIG. 4.

The judgement circuit 28 is adapted to store reference ratios IR0/IG0 and IB0/IG0, which are initially obtained on the basis of a "white" camera subject illuminated by light sources having various color temperatures, and, on the basis of such reference ratios, the judgement circuit 28 generates a blackbody radiation curve CBL with two tracking ranges $A_1$ and $A_2$, as shown in FIG. 5. The characteristics of the curve CBL in FIG. 5 are generally similar to the characteristics of the curve CBL described with reference to FIG. 2 and will not be repeated. The judgement circuit 28 is further adapted to decide whether or not there is a three phase change in the color temperature of the light source, and whether the ratios IR/IG and IB/IG, which are provided in the intervals T61, T62, T63 shown in FIG. 7, lie within tracking ranges $A_1$ or $A_2$. Then, in a manner similar to what has been described with reference to FIG. 2, white balancing is only effected when the ratios IR/IG and IB/IG lie within the tracking ranges $A_1$ or $A_2$.

The operation of the judgement circuit 28 will now be further described with reference to the flowchart of FIG. 6.

As previously described, the ratios IR/IG and IB/IG are supplied to judgement circuit 28. At an initial step 101, it is determined whether or not a three phase change exists in the integrated output signals IR, IG, IB by detecting if a change occurs in the ratios IR/IG and IB/IG in intervals T61, T62 and T63. For example, when a fluorescent lamp energized by a power supply frequency of 50 Hz is used for illuminating the scene in the field of view, the ratio levels IR/IG and IB/IG vary between intervals T61, T62 and T63, as shown in FIG. 7, and such variations are repeated during intervals T21, T22 and so forth. Thus, by detecting the change in ratio levels which occur between intervals T61, T62 and T63, the presence of a three phase change is detected.

Figure 6:
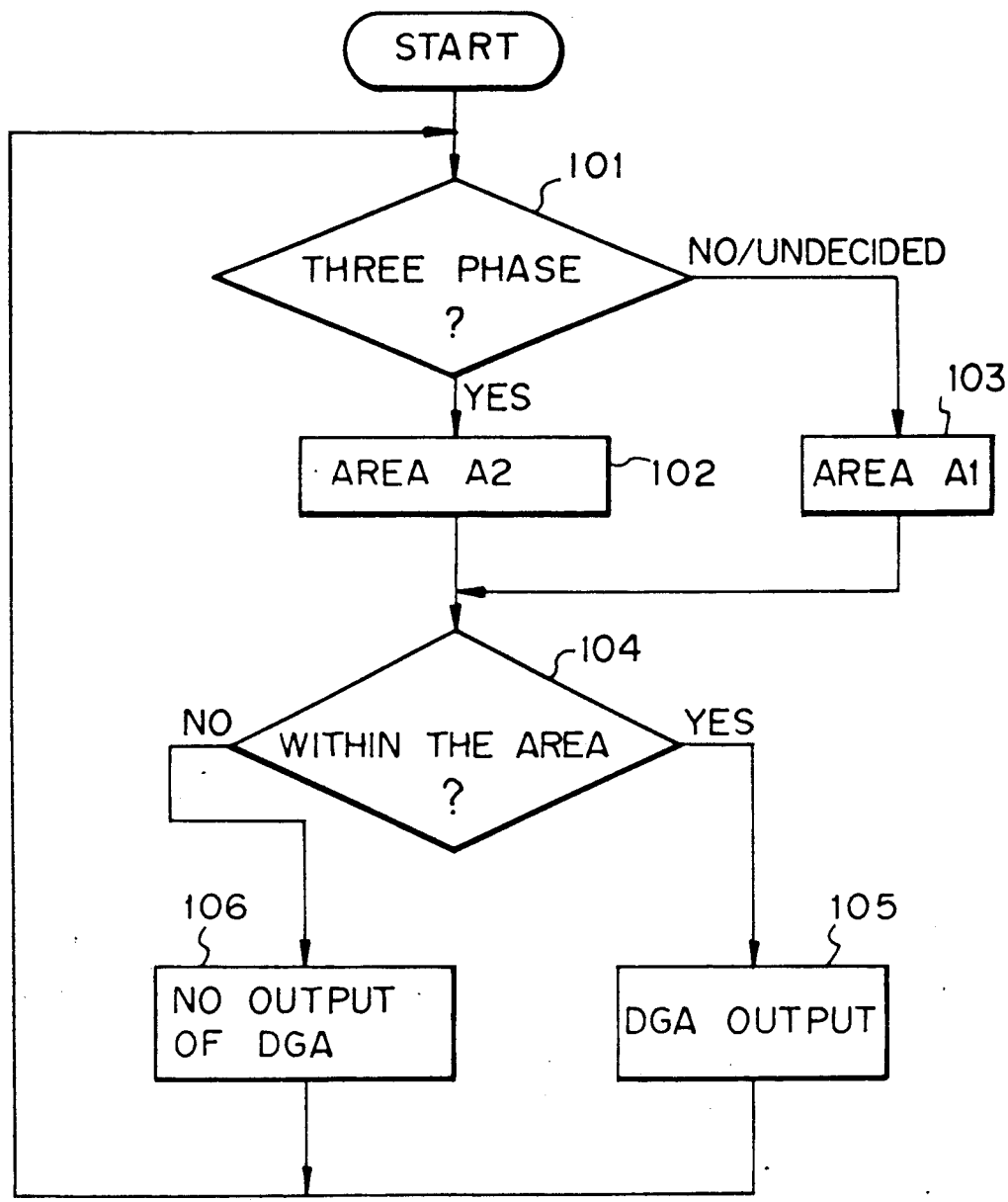
FIG. 6 is a flowchart to which reference will be made in explaining the processing performed in a decision circuit included in the white balance control circuit of FIG. 4.

If the answer to step 101 is affirmative, tracking range $A_2$ is selected in step 102 of FIG. 6. On the other hand, if the answer to step 101 is negative, or if a determination cannot be made as to whether or not a three phase change exists, tracking range $A_1$ is selected in step 103. For example, until completion of the initial interval T21, the existence of a three-phase change cannot be determined, and in that case, tracking range $A_1$ is used for interval T21. Upon the completion of interval T21, the occurrence of a three-phase change can be determined from the phases Phl, Ph2 and Ph3 in interval T21 and then the appropriate tracking range can be selected for the subsequent interval, that is, the interval T22. For example, if a three phase change is detected in interval T21, tracking range $A_2$ is selected for the following interval T22.

Identification of the tracking range selected in step 102 or 103 is supplied to step 104 wherein, the ratios IR/IG and IB/IG are compared with the stored blackbody radiation curve CBL and a determination is made whether such ratios fall within the selected tracking range $A_1$ or $A_2$. If the answer to step 104 is affirmative, a gain control signal DGA is outputted from judgement circuit 28 to gain control signal generator 29, as indicated in step 105. On the other hand, if the answer to step 104 is negative, there is no output of the gain control signal DGA as indicated in step 106. Upon completion of step 105 or 106, the operation of judgement circuit 28 in an interval, for example, in the interval T22, is completed, and, thereupon, the decision processing is repeated as shown in FIG. 6.

As previously mentioned, the gain control signal DGA is supplied from the judgement circuit 28 to the gain control signal generator 29 which is adapted to calculate the adjusted gain levels of the color signals R and B based on the ratios IR/IG and IB/IG for each phase Ph1, Ph2 and Ph3. The calculated adjusted gain levels are supplied as control signals DGR and DGB to variable gain amplifiers 55 and 57 through digital-to-analog converters 31 and 30, respectively. The gain levels of the variable gain amplifiers 55 and 57, which are proportionally controlled by control signals DGR and DGB, respectively, for each of the phases Phl, Ph2 and Ph3, can be expressed as follows:

gain of amplifier 55 (Rg) = 1/(IR/IG)

gain of amplifier 57 (Bg) = 1/(IB/IG)

As a result, the output signal levels of the three primary color signals R, G and B from amplifiers 55, 56 and 57, respectively, are adjusted or balanced to be equal to each other, that is, (R:G:B=1:1:1), when the camera is focused on a "white" subject. Thus, so long as the ratios IR/IG and IB/IG lie within the selected tracking range $A_1$ or $A_2$, white balancing may be achieved for obtaining improved color reproduction even though the power supply frequency for the light source differs from the field or exposure frequency of the video camera.

When the gain control signal DGA is not output from judgement circuit 28, as in step 106 of FIG. 6, the ratios IR/IG and IB/IG lie outside the selected tracking range $A_1$ or $A_2$ whereby white balancing is difficult to perform. Accordingly, in this situation, further white balancing is not performed and the gain levels of variable gain amplifiers 55 and 57 are maintained at their previous levels.

In a manner similar to that described with reference to FIG. 1, the color signals R, G and B from variable gain amplifiers 55, 56 and 57, respectively, are converted into color difference signals R-Y and B-Y by a matrix circuit 64. The color difference signals R-Y and B-Y and a luminance signal Y from a terminal 65 are supplied to an encoder 66, which is adapted to convert the received signals into a color video signal SVD according to the NTSC format available an output terminal 67.

In the automatic white balance control circuit according to an embodiment of the present invention as described hereinabove, integrated value signals are calculated for each phase of the imager output and are utilized for automatic white balancing so that improved automatic white balancing is obtained. As a result, the described generation of flicker having a frequency of 20 Hz, is prevented. Further, a three phase change due to variation of color temperatures of a light source can be detected whereby, an appropriate tracking range can be adaptively selected. Thus, even if the light source has a relatively wide range of variation of color temperatures, corresponding adaptive automatic white balancing can be achieved.

Although the described embodiment of the invention is applied to a feedforward type automatic white balancing circuit, the present invention is not so limited and can also be applied to a feedback type-automatic white balancing circuit.

Furthermore, although a preferred embodiment of the present invention has been described in detail herein with reference to the accompanying drawings, it is to be understood that the invention is not limited to that precise embodiment, and that various changes and modifications can be effected therein by one skilled in the art without departing from the scope or spirit of the invention as defined in the appended claims.

What is claimed is:

1. An automatic white balance control circuit for adjusting gain levels of a plurality of color signals included in a video signal composed of successive video fields and received from a video camera while a light source provides illumination for the scene in the field of view of the camera, comprising:

first integrating means for generating a first integration output signal for each of said color signals in a first field;

second integrating means for generating a second integration output signal for each of said color signals in a second field occurring after said first field;

third integrating means for generating a third integration output signal for each of said color signals in a third field occurring after said second field;

generating means for generating at least two control signals for each of said fields on the basis of said first, second and third integration output signals for the respective field; and gain control means for adjusting gain levels of at least two of said color signals in response to respective ones of said control signals so as to effect white balancing.

2. An automatic white balance control circuit according to claim 1; further comprising detecting means for detecting a change of said first, second and third integration output signals.

3. An automatic white balance control circuit according to claim 2; further comprising dividing means for dividing said first integration output signal by said second integration output signal and said third integration output signal by said second integration output signal so as to obtain first and second signal ratios, respectively; and in which said detecting means includes comparing means for comparing said signal ratios to a range of reference signal ratios.

4. An automatic white balance control circuit according to claim 3; in which said range of reference signal ratios is selected from a first range and a second range.

5. An automatic white balance control circuit according to claim 4; in which, in the absence of a detected change, white balancing is performed if said signal ratios lie within said first range, and, upon detection of said detected change, white balancing is performed if said signal ratios lie within said second range.

6. An automatic white balance control circuit according to claim 3; in which each of said two control signals is proportional to the respective inverse of said first and second divided signals.

7. An automatic white balance control circuit according to claim 2; in which said first, second and third integration output signals vary in accordance with the color temperature of said light source.

8. An automatic white balance control circuit according to claim 7; in which said light source is a fluorescent lamp.

9. An automatic white balance control circuit according to claim 8; in which the video camera has a predetermined exposure frequency, and said fluorescent lamp is energized by a power supply having a frequency different from said exposure frequency; and in which said first, second and third integration output signals correspond to respective phases due to the difference between said video camera exposure frequency and said power supply frequency.

10. An automatic white balance control circuit according to claim 9; in which said video camera exposure frequency is 60 Hz and said light source power supply frequency is 50 Hz.

11. An automatic white balance control circuit according to claim 1; in which said plurality of color signals include three signals each for a respective one of three primary colors.

12. An automatic white balance control circuit for adjusting gain levels of a plurality of color signals included in a video signal composed of successive video fields received from a video camera while a light source provides illumination for a scene in the field of view of the camera, comprising:

first integrating means for generating a first integration output signal for each of said color signals in a first field;

second integrating means for generating a second integration output signal for each of said color signals in a second field occurring after said first field;

third integrating means for generating a third integration output signal for each of said color signals in a third field occurring after said second field;

first, second and third analog-to-digital converters for digitally converting said first, second and third integration output signals, respectively;

generating means for generating at least two digital control signals for each of said fields on the basis of the first, second and third digitized integration output signals for the respective fields;

digital-to-analog converter means for converting said digital control signals to respective analog control signals; and gain control means for adjusting gain levels of at least two of said color signals in response to respective ones of said analog control signals so as to effect white balancing.

13. An automatic white balance control circuit according to claim 12; further comprising detecting means for detecting a change of said first, second and third digitized integration output signals.

14. An automatic white balance control circuit according to claim 12; further comprising dividing means for dividing said first digitized integration output signal by second digitized integration output signal and said third digitized integration output signal by second digitized integration output signal as to obtain first and second signal ratios, respectively; and in which said detecting means includes comparing means for comparing said signal ratios to a range of reference signal ratios.

15. An automatic white balance control circuit according to claim 14; in which said range of reference signal ratios is selected from a first range and a second range.

16. An automatic white balance control circuit according to claim 15; in which, in the absence of a detected change, white balancing is performed if said signal ratios lie within said first range, and, upon detection of said detected change, white balancing is performed if said signal ratios lie within said second range.

* * * * *